United States Patent [19]
Hutchins, Jr.

[11] 3,810,696
[45] May 14, 1974

[54] IMPROVED ANALYTICAL APPARATUS FOR MEASURING LIGHT ABSORBANCE OF FLUIDS

[75] Inventor: Burleigh M. Hutchins, Jr., North Attleboro, Mass.

[73] Assignee: Waters Associates, Inc., Framingham, Mass.

[22] Filed: Feb. 20, 1973

[21] Appl. No.: 334,135

[52] U.S. Cl............................ 356/93, 356/95, 356/97
[51] Int. Cl................................................ G01j 3/42
[58] Field of Search .................. 356/93, 95, 96, 97; 250/217 R

[56] References Cited
UNITED STATES PATENTS

| | | | |
|---|---|---|---|
| 3,583,813 | 6/1971 | Shibata et al. | 356/93 |
| 3,733,137 | 5/1973 | Badessa | 356/93 |
| 3,354,315 | 11/1967 | Preston et al. | 250/217 R |
| 3,585,442 | 6/1971 | Krusche et al. | 250/217 R |
| 3,437,411 | 4/1969 | Rudomanski et al. | 356/93 |

Primary Examiner—Ronald L. Wibert
Assistant Examiner—V. P. McGraw
Attorney, Agent, or Firm—Cesari and McKenna

[57] ABSTRACT

A spectrophotometer having a highly advantageous combination of sensitivity and usefulness over a broad spectrum of wavelength. The primary feature of the apparatus is a rapidly pulsed flash tube, say a xenon flash tube, used in conjunction with a dual photodetector and appropriate timing circuits. The device not only achieves the aforementioned advantages but also provides a more constant light source than those presently available, and, allows construction of a more compact and versatile instrument.

31 Claims, 4 Drawing Figures

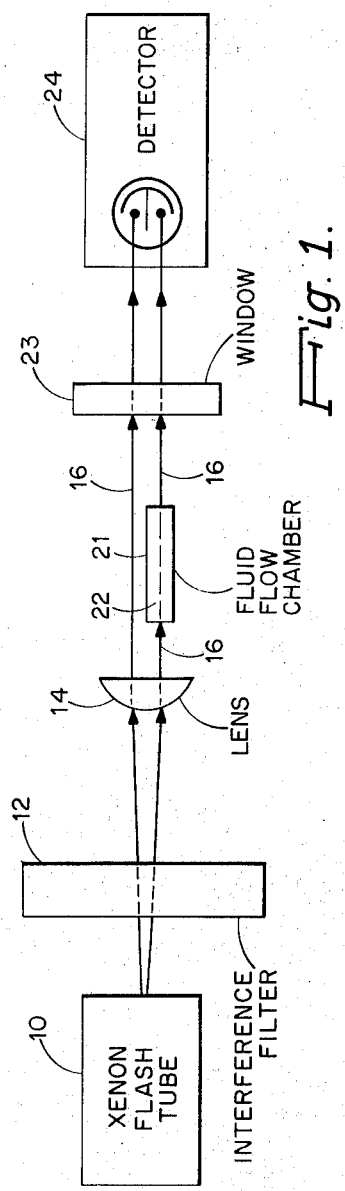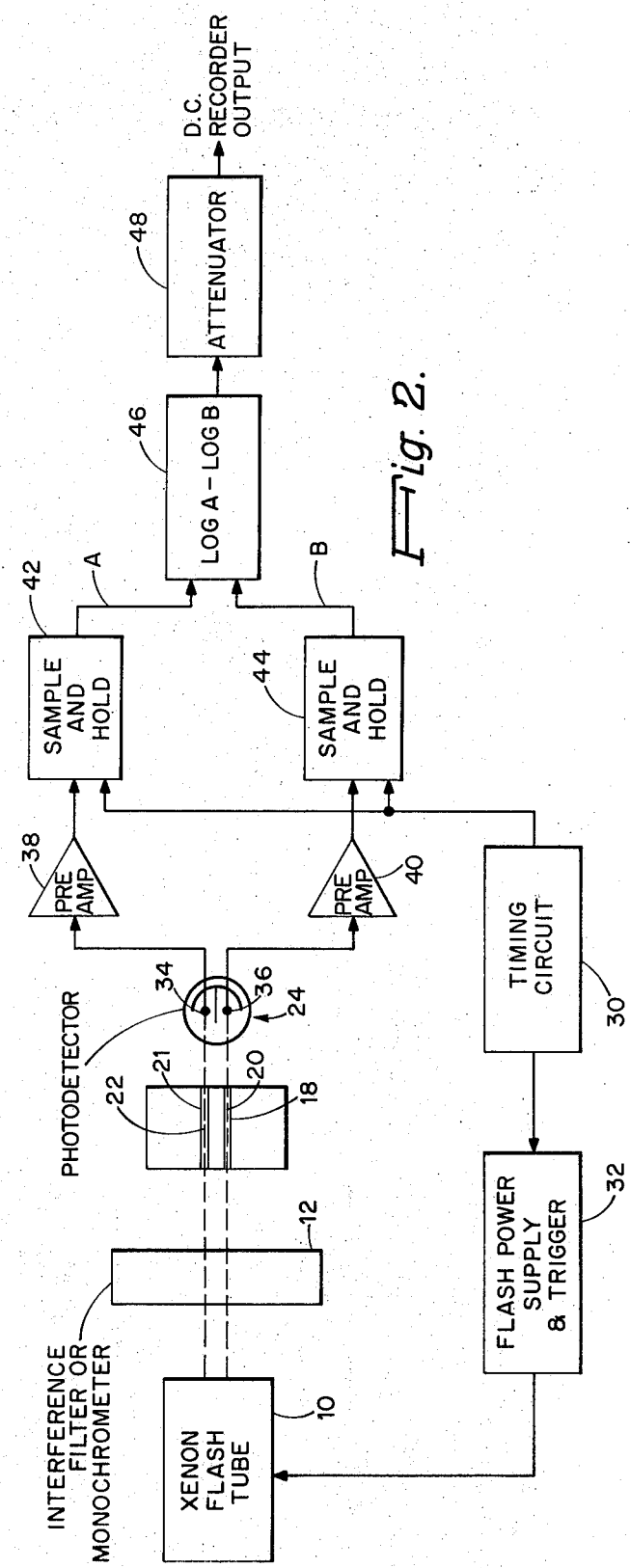

IMPROVED ANALYTICAL APPARATUS FOR MEASURING LIGHT ABSORBANCE OF FLUIDS

BACKGROUND OF THE INVENTION

In the art of chemical analysis, there have been two basic types of light-absorbing instruments. The first type, often used in high speed liquid chromatography procedures, is generally equipped with a very small liquid cell (10 microliters is typical) which has a very high sensitivity (e.g. an absorbance of 0.01 units full scale), and a light source of fixed wavelength, say 254 nonometers as would be obtained from a low-pressure mercury source. Sometimes the selected wavelength is modified, e.g. by positioning a fluorescent material between the light source and the cell containing the liquid being analyzed.

A second type of spectrometer in general use is that which utilizes a wide-range light source, say a hydrogen or deuterium lamp, in series with a monochrometer or interference filter either of which may provide means for providing a variable wavelength, ultraviolet or visible light source. Only a small portion of the energy generated by these wide-spectrum sources is actually transmitted to the sample being analyzed. Consequently, either the light available from the source is undesirably small or the amount of heat which must be dissipated is undesirably large. After practical compromise of design considerations, the problems of both heat and light intensity will exist in such apparatus. Thus the sample cell is usually made many times larger in diameter than the cells used in the first type of apparatus; this assures the quanta of light absorbed during passage through the cell will be sufficient to facilitate measurement. Moreover some means is also required to dissipate extraneous heat so it will not affect the sample. Despite these design precautions, the sensitivity of such a device is typically about 1.0 absorbance units. One high cost of operating such a unit is replacement of the broad-spectrum light source which costs about $100 or so and has a typical service life of but 200 operating hours.

Thus the chemist, process-control engineer, and any other person faced with selecting a spectrometer has been given a choice between two basic types of apparatus: The first type has better sensitivity and a capability of handling very small samples without excessive dilution or "peak spreading" of the sample, but it also has the disadvantage of operating at a fixed wavelength. The second type lacks the advantages of the first type but can be operated at a wide variety of wavelengths.

The problem faced by the inventor was to provide an apparatus having the advantages of each of the pre-existing kinds of spectrometers while avoiding the disadvantages of each. Actually, the foregoing statement is probably excessively grandiose: while it certainly was the problem faced by the inventor to provide an improved and more versatile spectrometer to meet the needs of the liquid chromatographer, it was not foreseen that such an improvement could be made retaining all the good features, but avoiding all the undesirable features, of prior art devices.

SUMMARY OF THE INVENTION

Therefore, it is a principal object of the invention described herein to provide an improved spectrometer apparatus. More particularly, it is an object of the invention to provide a spectrometer which is at once more versatile than any known to the art, and also inexpensive to manufacture and maintain, while providing a much improved sensitivity over pre-existing instruments. In some embodiments of the invention one or more of these objects may be absent because of the desire of the user to maximize one or more of the other attributes of the apparatus. However, since the instrument described herein represents a major step forward in spectrometry, those skilled in the art will, on reading this application, recognize many other specific objects of the invention.

The above objects have been substantially obtained by construction of a spectrometer comprising, as the light source therein, a broad-spectrum flash tube such as a xenon flash tube together with electronic circuitry designed to sample the flash in such a way as to measure only that portion of the light cycle which provides a series of light transmissions of superior stability together with sufficient shielding between the flash tube and responding circuitry to avoid radiation or capacitive coupling between the tube and circuitry thus preventing the high energy output of the tube interfering with the measurements carried out with the instrument.

The following advantages over prior art equipment can be more fully explained in view of the foregoing statement of the invention.

1. The apparatus is more sensitive: The power rating of the flash tube will normally be in the range of from 0.5 watt to 10 watts. It is usually such that the power rating of each flash is at least 5000 watts. Even with a xenon flash tube of only one watt average power input, if the duration of the flash is two microseconds, and the tube is flashed ten times per second, the intensity of the flash in terms of power input will be 50,000 watts. The frequency of flashing will conveniently be in the range of from one to 10 times per second, advantageously at least five times per second. The tremendous amount of light generated for analytical purposes (a) allows extremely small samples to be subjected to analysis, or (b) allows extremely small quantities of material to be detected with conventional sample cell sizes. In either situation, the capabilities of the spectrometry process are advanced markedly.

2. The apparatus is more reliable: This advantage results in interaction of many different features. For example, the proposed flash tubes have a service life which is of a magnitude longer than present wide-spectrum light sources. Moreover, present wide-spectrum sources, of far less sensitivity than is possible to achieve with the apparatus of the invention, also generate so much heat that special apparatus (such as air blower means) must be employed to keep that apparatus cool.

3. The apparatus is less expensive to manufacture and operate: The light source costs a small fraction of conventional wide-spectrum sources. As has been seen above, heat-removal equipment is not required. Moreover, from the operator's standpoint, there is a need only to use a very small sample and this can allow very significant savings in laboratory time, or can make a small sample incapable of exact duplication available for more test procedures with less risk in handling. Because of the minimal peak spreading, continuous operation is possible with very small samples.

Assuming a one-watt light source and a typical monochrometer, the resultant light reaching the sample will still be as intense as the mercury line from a four-watt lamp.

4. The apparatus is more compact: In essence, the size advantage of the smaller units of fixed wavelength known to the art can now be incorporated in wide-spectrum units having a capability for even greater sensitivity. This advantage is very important because it, for the first time, allows the bench operator to have a conveniently-available item available as a laboratory bench tool, not an exotic piece of apparatus which is available in a central analytical group.

In constructing the apparatus, it was discovered that an extremely steady light source could be achieved by synchronizing the measurement of the transmitted light with selected portion of the light flash. This provided another contribution to sensitivity characteristics of the instrument.

One interesting feature of the invention is the fact that it is possible to operate the new spectrometer without use of a reference liquid and, indeed, without the use of any reference light path at all. This latter advantage is a result of the high stability of the light source compared to most sources used in the prior art. Nevertheless, it is often desirable to have a light-source reference signal. In such a case, this output signal of the spectrometer is the log of the ratio between the light intensity of (1) a beam from the light source which has passed through a sample and (2) a reference beam.

ILLUSTRATIVE EXAMPLE OF THE INVENTION

In this application and accompanying drawings there is shown and described a preferred embodiment of the invention and suggested various alternatives and modifications thereof, but it is to be understood that these are not intended to be exhaustive and that other changes and modifications can be made within the scope of the invention. These suggestions are selected and included for purposes of illustration in order that others skilled in the art will more fully understand the invention and the principles thereof and will be able to modify it in a variety of forms, each as may be best suited in the condition of a particular case.

IN THE DRAWINGS

FIG. 1 is a schematic diagram of an optical system utilized with an apparatus constructed according to the invention.

FIG. 2 is a schematic electronic diagram constructed according to the invention.

Figure 3:
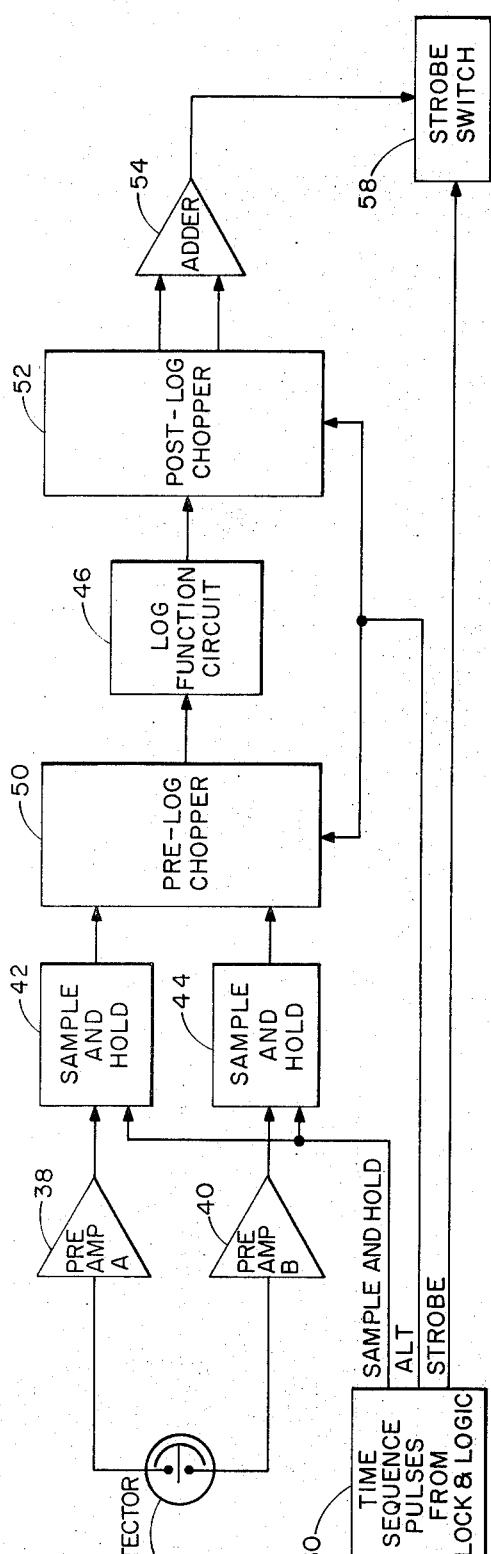
FIG. 3 is a somewhat more detailed electronic diagram constructed according to the invention.

Referring to FIG. 1, it is seen that a xenon flash tube 10, such as that sold under the trade designation FX 108 AU by EG & G Company, is positioned to send a polychromatic light beam to a wavelength selector means such as interference filter 12, and thence a light beam of selected wavelength through a collimating lens 14. One of the parallel light paths 16 leaving lens 14 passes through a sample cell 21 containing a sample fluid 22, thence through a window 23 to a dual photodetector 24. Another path 16, a reference light path, bypasses the sample cell 21. Photodetector 24, thereupon responds to the light by generating two distinct signals one of which is derived from the light which has passed through the sample fluid, the other of which has not passed through the sample fluid.

FIG. 2 illustrates how the flash tube actuating signal is generated and processed. A timing circuit 30 triggers the flash tube power supply and trigger, both schematically indicated at 32, causing a flash of light from tube 10 to pass through interference filter 12. Parallel light paths so obtained proceed, one through the sample liquid and one not, and fall on photodetector cells 34 and 36, respectively of photodetector 24. Photodetector 24 may be, for example, that sold under the trade designation DT 1905-S5 manufactured by Tungsol Division of the Wagner Electric Company. The output of each detector cell is amplified in amplifiers 38 and 40 and then fed into sample-and-hold circuits 42 and 44 as seen in FIG. 2. Circuits 42 and 44 and flash tube 10 are controlled by the timing circuit 30 so that when the timing circuit energizes the flash tube, the timing circuit allows the light output of the flash tube to rise and then triggers the sample-and-hold circuits to sample the signal corresponding to a relatively uniform peak of the light output cycle from tube 10. The output of circuits 42 and 44 are at direct current levels which change abruptly each time a new flash is experienced. In order to display electronically the difference between the absorbance of sample-filtered light and the reference light path, an analog computation equivalent levels which change abruptly each time a new flash is experienced. In order to display electronically the difference between the absorbance of sample-filtered light and the reference light path, an analog computation equivalent to the log of the ratio of the signals received from the photodetector is taken by a log function circuit 46, fed to an attenuator 48 where it is made available as a DC signal to any appropriate recording device.

FIG. 3 discloses a somewhat more detailed schematic circuit from which the optical elements and sample cells have been entirely omitted for purposes of the drawing, but in which these elements will be understood to be placed as shown in FIGS. 1 and 2.

Amplifiers 38 and 40 comprise integrated circuit-type amplifiers known to the art as LM 310's. The amplifiers provide a gain in signal voltage and a conversion of the very high impedance levels from photodetector 24 to lower impedance levels less subject to noise interference. Amplifiers 38 and 40 also each comprise a second amplifier of the A715 type.

After the signals leave the amplifiers, field effect switches are used to strobe the output voltage of the amplifiers onto a polyester capacitor which, together with a high input impedance amplifier, serve as the sample-and-hold circuits 42 and 44. In general, the effect of the sample-and-hold circuits provides means to select a relatively small section of the light-flash frequency which gives a relatively constant illumination over the selected period. So doing provides an extremely constant light source.

To achieve more accuracy in obtaining an analog signal of log A-log B, the signals from the sample and reference channels were fed to a log function circuit 46 comprising a pre-log chopper 50, and a post-log chopper 52. The output from post-log chopper 52 is fed into an adder 54 whereby, in effect, the signals derived from the reference and sample light paths are subtracted producing an output signal.

The output signal is then fed back to a strobe circuit which is utilized to avoid a noise spike which tends to occur when the choppers switch from reference to sample signals. The output of the strobe is fed to the attenuator switch 48, through another amplifier 56 and to a recorder.

A number of construction methods are advantageous in further increasing the sensitivity and versatility of the apparatus. These primarily relate to the shielding necessary to prevent the photodetector from radiation effects caused by the high frequency light pulsing apparatus. Typically this pulsing means will be operated about 500 kilohertz. One procedure is to provide metal shielding on the leads from the photodetector, orient the leads to move directly away from the light source and give them each a half-twist before they enter amplifiers 38 and 40.

Figure 4:
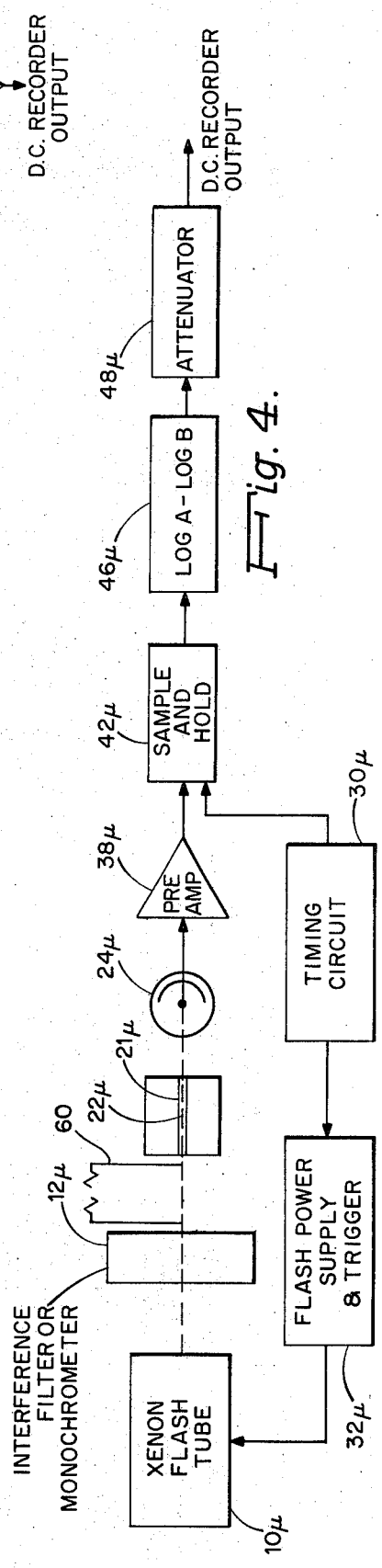
FIG. 4 is similar to FIG. 2 and discloses a system having a single light path.

Another procedure is to take advantage of the very high light output rate of the light source by placing the source remote from the photodetector and transmitting the light to the photodetector by light-carrying fibers of the type known to the art as indicated by alternate lightpath 60 in FIG. 4.

FIG. 4 is a schematic illustrating a particular advantage of the invention. The typical xenon flash tube is entirely suitable for use in many applications without any reference light path. This is a consequence of its prolonged stability. In FIG. 4, a reference is used, i.e. an input voltage as a calibration means. In practice, it is practical to have this a nominal reference value of "1."

The identifying numerals for FIG. 4 are the same as for FIG. 2 except that they have a subscript "u." Photodetector 24u is, of course, a single-sensor unit.

It is also to be understood that the following claims are intended to cover all of the generic and specific features of the invention herein described and all statements of the scope of the invention which might be said to fall therebetween.

What is claimed is:

1. In a spectrometer of the type used to measure absorption of light and comprising a light source, a transparent cell adapted to receive a fluid and an electronic circuit comprising a photoelectric device for receiving light transmitted through said fluid from a said light source and thence passed through said transparent cell to said photoelectric device, the improvement wherein 1. said light source is a flash tube forming means to provide a series of consecutive flashes during said measuring of light; and
   2. said electronic circuit comprises means adapted to selectively measure a pre-selected, maximum component of the time-intensity curve of the light output from each flash of said tube.

2. A spectrometer as defined in claim 1 wherein said flash tube is a polychromatic flash tube having a power rating of in excess of 5,000 watts for each flash.

3. A spectrometer as defined in claim 2 wherein said flash tube is a xenon flash tube.

4. A spectrometer as defined in claim 1 wherein light-conducting fibers form a light path between said photodetector and light source.

5. A spectrometer as defined in claim 2 wherein light-conducting fibers form a light path between said photodetector and light source.

6. A spectrometer as defined in claim 5 wherein said flash tube is a xenon flash tube and has a power rating of at least 50,000 watts for each flash.

7. Apparatus as defined in claim 1 wherein said photoelectric device receives only a light signal transmitted through a liquid.

8. Apparatus as defined in claim 6 wherein said photoelectric device receives only a light signal transmitted through a liquid.

9. A spectrometer as defined in claim 1 wherein said photoelectric device is a dual photodiode, having one photoresponsive element thereof adapted to receive light from said flash tube through a first sample fluid cell, and the other photoresponsive element thereof adapted to receive light from said flash tube without said light passing through said sample fluid cell.

10. A spectrometer as defined in claim 2 wherein said photoelectric device is a dual photodiode, having one photoresponsive element thereof adapted to receive light from said flash tube through a first sample fluid cell, and the other photoresponsive element thereof adapted to receive light said flash tube without said light passing through said sample fluid cell.

11. A spectrometer as defined in claim 6 wherein said photoelectric device is a dual photodiode, having one photoresponsive element thereof adapted to receive light from said flash tube through a first sample fluid cell, and the other photoresponsive element thereof adapted to receive light from said flash tube without said light passing through said sample fluid cell.

12. A spectrometer as defined in claim 5 wherein said photoelectric device is a dual photodiode, having one photoresponsive element thereof adapted to receive light from said flash tube through a first sample fluid cell, and the other photoresponsive element thereof adapted to receive light from said flash tube without said light passing through said sample fluid cell.

13. A spectrometer as defined in claim 8 wherein said photoelectric device is a dual photodiode, having one photoresponsive element thereof adapted to receive light from said flash tube through a first sample fluid cell, and the other photoresponsive element thereof adapted to receive light from said flash tube without said light passing through said sample fluid cell.

14. Apparatus as defined in claim 1 wherein said transparent cell is adapted to receive a continuously flowing liquid.

15. Apparatus as defined in claim 1 wherein said light source is adapted to flash from about one to 10 times per second.

16. In a process of measuring the light transmitting characteristics of a fluid sample of the type wherein light from a common source is transmitted in part through the sample and in part as a reference beam to electronic measuring means, then electronically processing said light to provide a signal suitable for analysis, the improvement wherein said process comprises the steps of A. emitting said light from a flashing lamp in pulses occurring as frequently as at least once per second;

B. beaming a portion of light emitted by said lamp through said sample fluid and a portion of said light to bypass said sample fluid, then each said portion to impinge on a distinct photosensitive area of a photoelectric device; and C. electronically comparing the two signals from each said area to obtain a comparison signal for analysis.

17. A process as defined in claim 16 wherein light from said light source to said photosensitive areas is transmitted in part through a light conductive solid.

18. A process as defined in claim 16 wherein said electronic comparing step comprises the selective measurement of a pre-selected portion of the time-light intensity wave of a plurality of flashes, said portion being approximately along the line of greatest light intensity.

19. A process as defined in claim 16 wherein said fluid is a gas-based fluid.

20. A process as defined in claim 18 wherein said fluid is a gas-based fluid.

21. A process as defined in claim 17 wherein said electronic comparing step comprises the selective measurement of a pre-selected portion of the time-light intensity wave of a plurality of flashes, said portion being approximately along the line of greatest light intensity.

22. A process as defined in claim 16 wherein said fluid sample is flowing during said measuring process.

23. A process as defined in claim 16 wherein said light flashes from about one to 10 times per second.

24. In a process for measuring the light transmitting characteristics of a fluid sample of the type wherein light is transmitted through said sample and electronically measured to provide a signal suitable for analysis, the improvement wherein said process comprises the steps of A. emitting said light from a flashing lamp in pulses occurring as frequently as at least once per second;

B. beaming said light through said sample fluid to a distinct photosensitive area of a photoelectric device; and C. electronically processing the signal of said photoelectric to obtain a output signal for analysis.

25. A process as defined in claim 24 wherein light from said light source to said photosensitive areas is transmitted in part through a light conductive solid.

26. A process as defined in claim 24 wherein said electronic processing step comprises the selective measurement of a pre-selected portion of the time-light intensity wave of a pluraltiy of flashes, said portion being approximately along the line of greatest light intensity.

27. A process as defined in claim 24 wherein said electronic processing of said signal utilizes no electronic signal obtained from any reference light path.

28. A process as defined in claim 25 wherein said electronic processing of said signal utilizes no electronic signal obtained from any reference light path.

29. A process as defined in claim 26 wherein said electronic processing of said signal utilizes no electronic signal obtained from any reference light path.

30. A process as defined in claim 24 wherein said fluid sample is flowing during said measuring process.

31. A process as defined in claim 24 wherein said light flashes from about one to 10 times per second.

* * * * *